US006658246B1

(12) United States Patent
Helaine

(10) Patent No.: US 6,658,246 B1
(45) Date of Patent: Dec. 2, 2003

(54) SYSTEM FOR AND A METHOD OF CONTROLLING ACCESS TO A SERVICE AVAILABLE VIA A TELECOMMUNICATIONS TERMINAL CONNECTED TO A TELECOMMUNICATIONS NETWORK

(75) Inventor: Hubert Helaine, Putaux (FR)

(73) Assignee: Alcatel, Paris (FR)

( * ) Notice: Subject to any disclaimer, the term of this patent is extended or adjusted under 35 U.S.C. 154(b) by 539 days.

(21) Appl. No.: 09/599,856

(22) Filed: Jun. 23, 2000

(30) Foreign Application Priority Data

Jun. 28, 1999 (FR) .............................................. 99 08216

(51) Int. Cl.$^7$ ............................................. H04M 11/00
(52) U.S. Cl. ...................................... 455/408; 455/411
(58) Field of Search ................................ 455/405–408, 455/440, 411, 434, 558; 379/89, 144, 58

(56) References Cited

U.S. PATENT DOCUMENTS

| 5,319,699 A | * | 6/1994 | Kerihuel et al. ............. 455/461 |
| 5,339,352 A | * | 8/1994 | Armstrong et al. .......... 455/414 |
| 5,343,512 A | * | 8/1994 | Wang et al. ................. 455/410 |
| 5,371,493 A | * | 12/1994 | Sharpe et al. ............... 340/5.42 |
| 5,579,379 A | * | 11/1996 | D'Amico et al. ........... 379/114.01 |
| 5,588,042 A | | 12/1996 | Comer |
| 5,668,856 A | * | 9/1997 | Nishimatsu et al. ........ 379/88.18 |
| 5,751,798 A | * | 5/1998 | Mumick et al. ............. 379/114.24 |
| 5,909,485 A | * | 6/1999 | Martin et al. .............. 379/114.2 |
| 5,913,175 A | * | 6/1999 | Pinault ........................ 455/558 |
| 6,198,823 B1 | * | 3/2001 | Mills ........................... 380/247 |
| 6,216,014 B1 | * | 4/2001 | Proust et al. ............... 455/558 |
| 6,449,479 B1 | * | 9/2002 | Sanchez ...................... 455/433 |
| 6,463,286 B1 | * | 10/2002 | Salminen ..................... 455/453 |

FOREIGN PATENT DOCUMENTS

WO    WO 98/49817    11/1998

* cited by examiner

Primary Examiner—Nguyen T. Vo
Assistant Examiner—Tan Trinh
(74) Attorney, Agent, or Firm—Sughrue Mion, PLLC

(57) ABSTRACT

The invention provides a system for monitoring access to a service available via a telecommunications terminal connected to a telecommunications network, access to the service being subject to paying a subscription. The system includes: a unit configured to detect refusal of access to a service because there is no subscription to that service, a unit configured to prepare an electronic message following said access refusal, the message identifying the service to which access has been refused and the subscription enabling said terminal to use the telecommunications network to which the terminal is connected, and a unit configured to send the prepared message to a unit for monitoring attempts to access services to which there is no subscription.

29 Claims, 1 Drawing Sheet

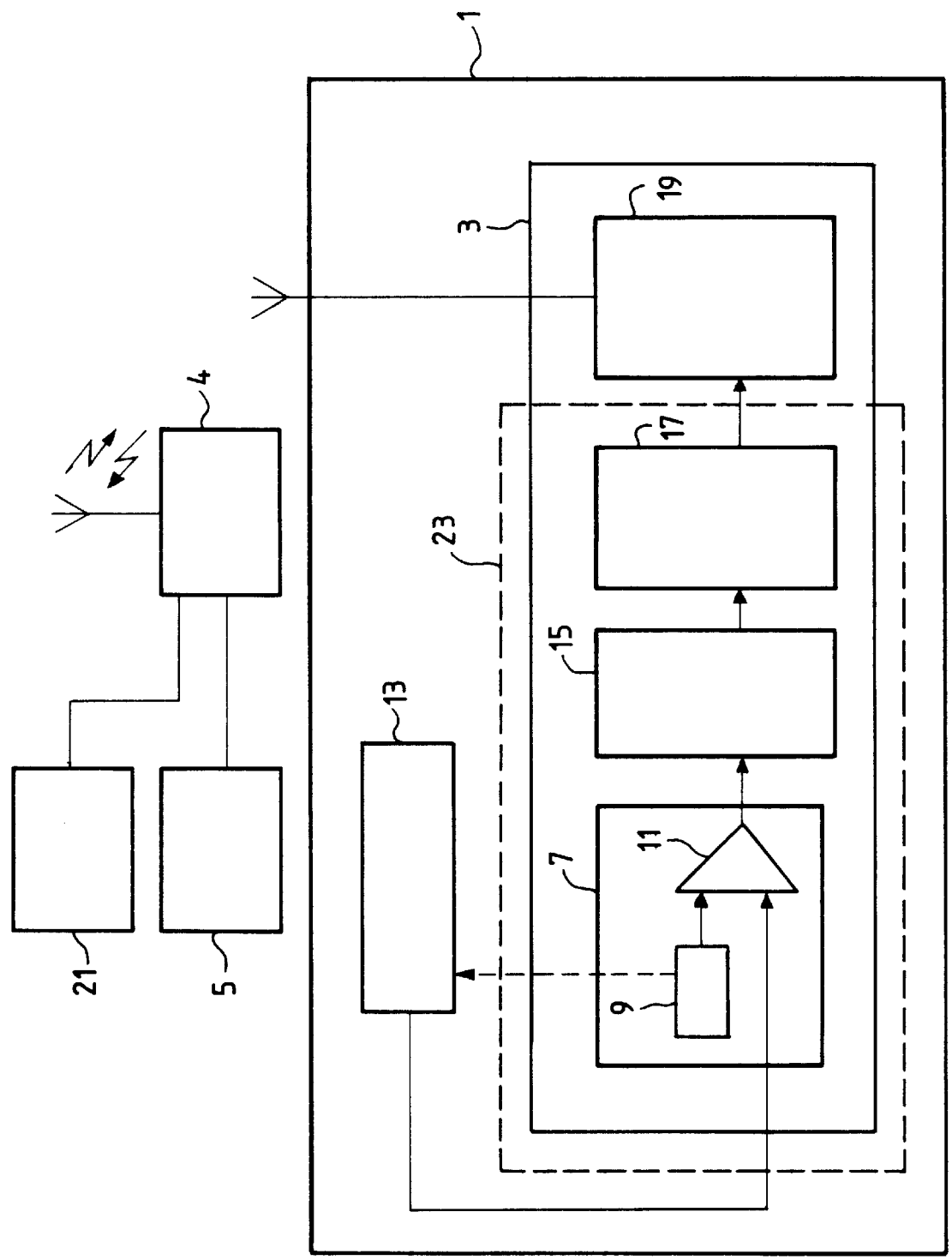

SYSTEM FOR AND A METHOD OF CONTROLLING ACCESS TO A SERVICE AVAILABLE VIA A TELECOMMUNICATIONS TERMINAL CONNECTED TO A TELECOMMUNICATIONS NETWORK

The present invention relates to a system for and a method of controlling access to a service which is available via a telecommunications terminal connected to a telecommunications network and access to which is subject to payment of a subscription.

BACKGROUND OF THE INVENTION

Telephones and computers which can connect to applications running on a remote server are known in the fields of mobile telephony and the INTERNET in particular.

For example, it is known to enquire the balance of one's account via the Internet by connecting to the Internet site of one's bank and entering one's account number and a PIN. It is also possible to carry out transactions of all kinds, for example to instruct a transfer or to order a chequebook.

Mobile telephones also provide access to applications running on a remote server, for example to look up train or flight times by entering a dedicated number of the transport operator concerned. Banking enquiries and transactions are also possible.

Also known in the art are network services of an intelligent telecommunications network such as voicemail, call forwarding and three-way conference calls.

These services, i.e. the applications and intelligent network services mentioned above, are available via a telecommunications terminal and are often subject to payment of a subscription authorizing access to the service.

In most cases, the telecommunications terminal includes a memory already containing access addresses or commands, such as IP addresses in the case of the Internet or telephone numbers for accessing these services.

However, telecommunications terminal users often attempt to access a service even though they are not a subscriber to that service, for example by entering a pre-stored telephone number, either because they would like to access the service or through mere curiosity. In such cases access to the service is refused. However, the service provider, such as the carrier in the case of network services or the proprietor of the application server in the case of remote applications, is unaware of the user's access attempt, because at present there are no technical means of providing access to information concerning attempts to access services to which there is no subscription.

OBJECTS AND SUMMARY OF THE INVENTION

To alleviate this drawback, the present invention proposes technical means which monitor access to a service from a telecommunications terminal to provide information on attempts to access services to which there is no subscription.

To this end, the invention provides a system for monitoring access to a service available via a telecommunications terminal connected to a telecommunications network, access to the service being subject to paying a subscription, the system including:

means for detecting refusal of access to a service because there is no subscription to that service, means for preparing an electronic message following said access refusal, the message identifying the service to which access has been refused and the subscription enabling said terminal to use the telecommunications network to which the terminal is connected, and means for sending the prepared message to a unit for monitoring attempts to access services to which there is no subscription.

The system can have one or more of the following features:

the means for detecting refusal of access include a memory containing information on authorization and refusal of access to said services and means for comparing said access authorization and refusal information and the identification of a service which the user of a terminal wishes to access, the comparator means supplying an access refusal signal to said electronic message preparation means in the event of an attempt to access a service to which there is no subscription, it further includes means for accumulating a predefined number of prepared messages and commanding sending of said messages when the predefined number of messages that can be accumulated is reached, it includes means for temporarily storing a prepared message and commanding sending of said messages after a predefined time interval, the electronic messages have a format corresponding to a predefined data transmission format of the telecommunications network, the predefined data transmission format of the telecommunications network is a SMS format or a USSD format, the service is a network service of the telecommunications network, the service is a remote application running on a remote application server.

The invention further provides a telecommunications terminal comprising a system as defined hereinabove.

The terminal according to the invention can have one or more of the following features:

it is a computer equipped with a modem connected to a telecommunications network such as a telephone network or a data communication network, it is a telephone, in particular a mobile telephone, use of which is conditional on the provision of an information medium containing telecommunications network subscriber identification information and the information medium includes a memory containing addresses or commands which are used to access pre-stored services, information identifying the services, and information on authorization or refusal of access to the services, the means for detecting refusal of access are included in the information medium, the information medium is a smart card having the functions of the GSM standard 11.14 relating to the "SIM TOOLKIT" and said means for detecting refusal of access use the call monitoring procedure defined in that standard.

The invention further provides a method of monitoring access to a service available via a telecommunications terminal connected to a telecommunications network, access to the service being subject to paying a subscription, the method including the steps of:

detecting refusal of access to a service because there is no subscription to that service, preparing an electronic message following said refusal of access, the message identifying the service to which access has been refused and the subscription enabling said terminal to use the telecommunications network to which the terminal is connected, and sending the prepared message to a unit for monitoring attempts to access services to which there is no subscription.

The method according to the invention can have one or more of the following features:

during the step of detecting refusal of access, the access authorization and refusal information is compared with the identification of a service the user of a terminal wishes to access and a refusal of access signal is supplied in the event of an attempt to access a service to which there is no subscription, a predefined number of prepared messages is accumulated and sending of said messages is commanded when the predefined number of accumulated messages is reached, a prepared message is stored temporarily and sending of said messages is commanded after a predefined time interval, the electronic messages have a format corresponding to a predefined data transmission format of the telecommunications network, the predefined data transmission format of the telecommunications network is a SMS format or a USSD format, the service is a network service of the telecommunications network, the service is a remote application running on a remote application server.

BRIEF DESCRIPTION OF THE DRAWING

Other features and advantages of the invention will emerge from the following description, which is given by way of non-limiting example and with reference to the accompanying drawing, which is a block diagram of a telecommunications terminal according to the invention.

MORE DETAILED DESCRIPTION

The single FIGURE is a block diagram of a telecommunications terminal 1 which includes a system 3 for monitoring access to a service which is available via the terminal 1 and access to which is conditional on paying a subscription.

By "service" is meant either a remote application running on a remote application server 5 or a network service of an intelligent telecommunications network, such as voicemail, call forwarding or three-way conference calls.

The telecommunications terminal 1 is a telephone, for example, in particular a mobile telephone.

In an advantageous variant of the invention, the telecommunications terminal 1 can be a computer equipped with a modem connected to a telecommunications network, for example a telephone network or a computer network such as the INTERNET.

The terminal is connected to a telecommunications network 4 and via that network to the remote server 5. The figure shows a mobile telephone network, but a terrestrial telecommunications network is equally feasible, of course.

The telecommunications network 4 can advantageously provide network services as mentioned above. It is then referred to as a "intelligent" telecommunications network.

Use of the telecommunications terminal is preferably conditional on supplying information identifying the subscriber to the telecommunications network to which the terminal 1 is connected. The information identifying the subscriber can be provided by means of an information medium, for example, such as a smart card, usually referred to as a subscriber identity module (SIM) card and containing information identifying the subscriber to the telecommunications network.

For example, the remote application server 5 is a data processing server containing a database, software, etc.

Each of the applications running on the server 5 has a dedicated connection address, which can be a telephone number or an Internet address.

The system 3 for monitoring access via the terminal 1 to services of the telecommunications network 4 or the server 5 includes detector means 7 for detecting refusal of access to a service, the detector means 7 detecting only refusal of access due to the lack of a subscription to that service.

To this end, the detector means 7 comprise a memory 9 containing information for authorizing and refusing access to the services of the telecommunications network 4 or the server 5 and means 11 for comparing access authorization or refusal information and information on a service which a user of the terminal wishes to use.

For example, the information on the service, such as its identity and activation commands in the case of a network service, or its connection address for access in the case of a remote application, and the information on authorization or refusal of access can be loaded into the memory 9 when a subscription is taken out with the operator of the telecommunications network to which the terminal 1 is connected or downloaded when the user of the terminal 1 takes out a subscription, for example.

The comparator means therefore have two inputs, one of which is connected to the memory 9 and the other of which is connected to selector means 13 for selecting a service, for example in order to access it. The selector means 13 are advantageously also connected to the memory 9 to obtain information identifying the services of the telecommunications network 4 or the remote server 5. The selector means 13 take the form of a display on the terminal 1 and a selector button, for example.

The output of the comparator means 11 is connected to the input of means 15 for preparing an electronic message following refusal of access because there is no subscription to the service selected by the user.

The means 15 prepare an electronic message identifying the service to which access has been refused and the subscription enabling the terminal to use the telecommunications network to which the terminal is connected, i.e. the subscription taken out with the telecommunications network operator. That subscription is then used to identify the user who has attempted to access the service, in order to offer the user a subscription to that service.

The format of the electronic messages is preferably a predefined data transmission format of the telecommunications network. In the case of a mobile telephone network, the predefined format is advantageously a short message service (SMS) format or an unstructured supplementary service data (USSD) format.

The output of the means 15 for preparing messages is connected to the input of means 17 for accumulating a predefined number of prepared messages.

All the messages prepared in this way can be grouped into a single data packet before they are sent from the terminal 1 via sending means 19 to a unit 21 for monitoring attempts to connect to services to which there is no subscription.

In a variant that is not shown, the system 3 does not include any message accumulator means 17 and the messages are sent directly via the sending means 19.

In another variant, also not shown, the accumulator means 17 are replaced by means which temporarily store a prepared message and command sending of messages after a predefined time interval or at a predefined time, for example during the night, when the telecommunications network is less busy.

The means 7, 15 and 17 are advantageously integrated into an information medium 23 such as a smart card.

The smart card is preferably a SIM card and has the functions of the GSM standard 11.14 relating to the "SIM TOOLKIT" to enable the means 7 for detecting refusal of access to employ the call monitoring procedure defined in that standard.

The operation of the terminal 1 and of the system 3 according to the invention are described hereinafter.

Users who wish to access a service of the telecommunications network or the server 5 first select a service from a list shown on a display of the terminal 1, for example, using the selector means 13. The list includes not only services to which the user has subscribed but also services to which the user has not subscribed.

Suppose that, out of mere curiosity, a user selects an application to which they do not subscribe.

In this case, the comparator means 11 deliver an access refusal signal to the means 15 for preparing an electronic message.

On receiving the connection refusal signal, the means 15 prepare an electronic message identifying the application to which access has been refused and the subscription enabling the terminal to use the telecommunications network to which it is connected.

A predefined number of message is advantageously accumulated in the means 17 before sending them via the sending means 19 to the monitoring unit 21. The accumulator means 17 command sending of the messages when the predefined number of messages that can be accumulated is reached.

In one variant, the electronic messages are sent directly via the sending means 19 to the unit 21.

In another variant, the electronic messages are stored temporarily and sent after a predefined time interval.

An electronic message received by the monitoring unit 21 can be processed to determine the applications to which it relates and, from the information on their subscription to the telecommunications network, the identity of a user who has attempted to access a service to which they do not subscribe. This significantly improves the quality of the service provided by the telecommunications network operator and the remote server since the invention enables the requirements of users to be understood better and makes it possible to offer them a subscription.

What is claimed is:

1. A system for monitoring access to a service available via a telecommunications terminal connected to a telecommunications network, access to the service being subject to paying a subscription, the system including:

means for detecting refusal of access to a service because there is no subscription to that service;

means for preparing an electronic message following said access refusal, the message identifying the service to which access has been refused and the subscription enabling said terminal to use the service of the telecommunications network to which the terminal is connected; and means for sending the prepared message to a unit for monitoring attempts to access services to which there is no subscription.

2. A system according to claim 1, wherein the means for detecting refusal of access include a memory containing information on authorization and refusal of access to said services and means for comparing said access authorization and refusal information and the identification of a service which the user of a terminal wishes to access, the comparator means supplying an access refusal signal to said electronic message preparation means in the event of an attempt to access a service to which there is no subscription.

3. A system according to claim 1, further including means for accumulating a predefined number of prepared messages and commanding sending of said messages when the predefined number of messages that can be accumulated is reached.

4. A system according to claim 1, including means for temporarily storing a prepared message and commanding sending of said messages after a predefined time interval.

5. A system according to claim 1, wherein the electronic messages have a format corresponding to a predefined data transmission format of the telecommunications network.

6. A system according to claim 5, wherein the predefined data transmission format of the telecommunications network is a SMS format or a USSD format.

7. A system according to claim 1, wherein the service is a network service of the telecommunications network.

8. A system according to claim 1, wherein the service is a remote application running on a remote application server.

9. A telecommunications terminal for monitoring access to a service available via the telecommunications network connected to said terminal, access to the service being subject to paying a subscription, the terminal a detection unit configured to detect refusal of access to a service because there is no subscription to that service a message unit for preparing an electronic message following said access refusal, the message identifying the service to which access has been refused and the subscription enabling said terminal to use the service of the telecommunications network to which the terminal is connected; and a transmitting unit configure to send the prepared message to a unit for monitoring attempts to access services to which there is no subscription.

10. A terminal according to claim 9, the terminal being a computer equipped with a modem connected to a telecommunications network such as a telephone network or a data communication network.

11. A terminal according to claim 9, the terminal being a telephone, in particular a mobile telephone, use of which is conditional on the provision of an information medium containing telecommunications network subscriber identification information and wherein the information medium includes a memory containing addresses or commands which are used to access pre-stored services, information identifying the services, and information on authorization or refusal of access to the services.

12. A terminal according to claim 11, wherein the means for detecting refusal of access are included in the information medium.

13. A terminal according to claim 12, wherein the information medium is a smart card having the functions of the GSM standard 11.14 relating to the "SIM TOOLKIT"and wherein said means for detecting refusal of access use the call monitoring procedure defined in that standard.

14. A method of monitoring access to a service available via a telecommunications terminal connected to a telecommunications network, access to the service being subject to paying a subscription, the method including the steps of:

detecting refusal of access to a service because there is no subscription to that service, preparing an electronic message following said refusal of access, the message identifying the service to which access has been refused and the subscription enabling said terminal to use the service of the telecommunications network to which the terminal is connected, and sending the prepared message to a unit for monitoring attempts to access services to which there is no subscription.

15. A method according to claim 14, wherein, during the step of detecting refusal of access, the access authorization and refusal information is compared with the identification of a service the user of a terminal wishes to access and a refusal of access signal is supplied in the event of an attempt to access a service to which there is no subscription.

16. A method according to claim 14, wherein a predefined number of prepared messages is accumulated and wherein sending of said messages is commanded when the predefined number of accumulated messages is reached.

17. A method according to claim 14, wherein a prepared message is stored temporarily and wherein sending of said messages is commanded after a predefined time interval.

18. A method according to claim 14, wherein the electronic messages have a format corresponding to a predefined data transmission format of the telecommunications network.

19. A method according to claim 18, wherein the predefined data transmission format of the telecommunications network is a SMS format or a USSD format.

20. A method according to claim 14, wherein the service is a network service of the telecommunications network.

21. A method according to claim 14, wherein the service is a remote application running on a remote application server.

22. A system for monitoring access to a service available via a telecommunications terminal connected to a telecommunications network, access to the service being subject to paying a subscription, the system including:

a detection unit configured to detect refusal of access to a service because there is no subscription to that service, a message unit configured to prepare an electronic message following said access refusal, the message identifying the service to which access has been refused and the subscription enabling said terminal to use the telecommunications network to which the terminal is connected, and a transmission unit configured to send the prepared message to a unit for monitoring attempts to access services to which there is no subscription.

23. A system according to claim 22, wherein the detection unit includes a memory containing information on authorization and refusal of access to said services and a comparator unit for comparing said access authorization and refusal information and the identification of a service which the user of a terminal wishes to access, the comparator unit supplying an access refusal signal to said message unit in the event of an attempt to access a service to which there is no subscription.

24. A system according to claim 22, wherein the electronic messages have a format corresponding to a predefined data transmission format of the telecommunications network.

25. A system according to claim 24, wherein the predefined data transmission format of the telecommunications network is a SMS format or a USSD format.

26. A system according to claim 22, further including an accumulator configured to accumulate a predefined number of prepared messages and commanding sending of said messages when the predefined number of messages that can be accumulated is reached.

27. A system according to claim 22, including storage unit for temporarily storing a prepared message and commanding sending of said messages after a predefined time interval.

28. A system according to claim 22, wherein the service is a network service of the telecommunications network.

29. A system according to claim 22, wherein the service is a remote application running on a remote application server.

* * * * *